United States Patent [19]
Konishi

[11] Patent Number: 5,877,474
[45] Date of Patent: Mar. 2, 1999

[54] GLOW PLUG AND HEATING ELEMENT MADE OF CERAMIC MATERIAL

[75] Inventor: Masahiro Konishi, Aichi, Japan

[73] Assignee: NGK Spark Plug Co., Ltd., Nagoya, Japan

[21] Appl. No.: 827,160

[22] Filed: Mar. 27, 1997

[30] Foreign Application Priority Data

Mar. 29, 1996 [JP] Japan ..................... 8-103860

[51] Int. Cl.⁶ ................. H05B 3/12; F23Q 7/00
[52] U.S. Cl. ............. 219/270; 219/553; 123/145 A
[58] Field of Search ................... 219/270, 553; 123/145 A; 361/264, 266; 201/94, 96.1, 97.1

[56] References Cited

U.S. PATENT DOCUMENTS

| | | | |
|---|---|---|---|
| 4,634,837 | 1/1987 | Ito et al. ................... | 219/270 |
| 4,814,581 | 3/1989 | Nunogaki et al. ............ | 219/270 |
| 5,304,778 | 4/1994 | Dasgupta et al. . | |

FOREIGN PATENT DOCUMENTS

| | | |
|---|---|---|
| 0 335 382 | 4/1989 | European Pat. Off. . |
| 35 19 437 A1 | 5/1985 | Germany . |
| 60-28193 | 2/1985 | Japan . |
| 60-60983 | 4/1985 | Japan . |
| 60-216484 | 10/1985 | Japan . |
| 60-254586 | 12/1985 | Japan . |
| 63-96883 | 4/1988 | Japan . |
| 64-61356 | 3/1989 | Japan . |

*Primary Examiner*—John A. Jeffrey
*Assistant Examiner*—Vinod D. Patel
*Attorney, Agent, or Firm*—Finnegan, Henderson, Farabow, Garrett & Dunner, L.L.P.

[57] ABSTRACT

In a ceramic heater, a resistive heating element formed from a ceramic electrically conductive material is embedded in a ceramic body. The ceramic electrically conductive material has a structure in which particles of an electrically conductive ceramic phase are dispersed in a matrix ceramic phase, and contains the ceramic electrically conductive phase in a range of from 30 to 80% by weight. When a virtual circle is drawn with a certain radius in a section of said ceramic electrically conductive material, if the percentage of the area of said electrically conductive ceramic phase particles in the virtual circle is not smaller than 60%, a region enclosed by the circle is defined as an uneven distribution portion of said electrically conductive ceramic phase particles and the maximum diameter of the uneven distribution portion is set to be not larger than 5 $\mu$m.

8 Claims, 7 Drawing Sheets

GLOW PLUG AND HEATING ELEMENT MADE OF CERAMIC MATERIAL

BACKGROUND OF THE INVENTION

1. Field of the Invention

The present invention relates to a ceramic heater and, for example, to a ceramic heater-used in a ceramic glow plug or the like.

2. Description of the Related Art

Conventionally, as a ceramic heater used in a ceramic glow plug or the like, there has been known a ceramic heater in which a ceramic resistive heating element containing WC as a main component is embedded. in an electrically insulating ceramic body containing $Si_3N_4$ or the like as a main component.

In the aforementioned ceramic heater, because the thermal expansion coefficient of $Si_3N_4$ constituting the ceramic body is smaller than that of WC which is a main component of the resistive heating element, concentration of stress based on the difference between the thermal expansion coefficients may occur in the resistive heating element to bring a problem in the durability of the resistive heating element when a cycle of heating and cooling is repeated.

SUMMARY OF THE INVENTION

It is an object of the present invention is to provide a ceramic heater in which the problem in durability of the resistive heating element hardly occurs even if a cycle of heating and cooling is repeated.

A ceramic heater according to the present invention comprises a ceramic body; and a resistive heating element comprising a ceramic electrically conductive material which is embedded in the ceramic body, the ceramic electrically conductive material containing a matrix ceramic phase and electrically conductive ceramic phase particles dispersed in the matrix ceramic phase in the range of 30 to 80% by weight.

Applicant has found that in order to improve durability properties by reducing thermally induced stress within the resistive heating element, the electrically conductive ceramic phase should be maintained within a defined amount. If an area includes at least 60% of the electrically conductive ceramic phase particles, then the area is referred to as an uneven distribution portion. The maximum allowable size of this uneven distribution portion is one that is enclosed by a circle having a diameter of at most 5 μm.

While it is not necessary for the whole conductive portion to be composed of at least 60% of the electrically conductive ceramic particles, Applicant has unexpectedly discovered that breakage of the heating element more easily occurs when an area containing more than 60% of the electrically conductive ceramic particles extend beyond a portion encompassed by a circle having a diameter of 5 μm.

According to the present invention, it is possible to provide a ceramic heater in which there is little problem in the durability of the resistive heating element even in the case where a cycle of heating and cooling is repeated.

DETAILED DESCRIPTION OF THE INVENTION

Referring to the accompanying drawings, detailed description of the present invention will be described as follows.

The present invention relates to a ceramic heater in which a resistive heating element formed from a ceramic electrically conductive material is embedded in a ceramic body and, in order to solve the conventional problem, the present invention has a feature as follows. That is, the ceramic electrically conductive material has a structure in which particles of an electrically conductive ceramic phase are dispersed in a matrix ceramic phase, and contains the ceramic electrically conductive phase in a range of from 30 to 80% by weight.

Applicant has found that in order to improve durability properties by reducing thermally induced stress within the resistive heating element, the electrically conductive ceramic phase should be maintained within a defined amount. If an area includes at least 60% of the electrically conductive ceramic phase particles, then the area is referred to as an uneven distribution portion. The maximum allowable size of this uneven distribution portion is one that is enclosed by a circle having a diameter of at most 5 μm.

The inventor of the present invention has found that the durability of a resistive heating element when a cycle of heating and cooling is repeatedly applied to a heater, can be improved remarkably by setting the maximum diameter of the aforementioned uneven distribution portion of the electrically conductive ceramic phase particles to be not larger than 5 μm in the electrically conductive ceramic material constituting the resistive heating element.

Here, materials to be used as the electrically conductive material are selected by taking account of the coefficient of thermal expansion ($\times 10^{-6}/°C$.), the specific resistivity ($\mu\omega cm$), the coefficient of temperature resistance ((resistance at 1000° C.)/(resistance at room temperature)), and the melting point (°C.). It is preferable that the coefficient of thermal expansion of the electrically conductive material is within that of the ceramic body plus 10 ($\times 10^{-6}/$°C.) in account of the difference of their coefficient of thermal expansions, the ceramic body being selected by considering the degree of sintering, the heat/shock resistivity, the bend-resistant strength, and the like. The specific resistivity is preferably less than $10^3$ in account of the temperature increment characteristic. The coefficient of temperature resistance is within 1 to 20 in account of the self-control function. The melting point is not less than 1500° C. in account of the maximum temperature in practical use. Accordingly, the electrically conductive ceramic phase is mainly composed of at least compound selected from the group consisting of silicide of W, Ta, Nb, Ti, Mo, Zr, Hf, V and Cr; carbide of W, Ta, Nb, Ti, Mo, Zr, Hf, V and Cr; boride of W, Ta, Nb, Ti, Mo, Zr, Hf, V and Cr; and nitride of W, Ta, Nb, Ti, Mo, Zr, Hf, V and Cr. Table 1 shows examples of the compounds.

TABLE 1

MATERIAL CHARACTERISTIC VALUES (LITERATURE VALUES)

| | COEFFICIENT OF THERMAL EXPANSION ($\times 10^{-6}$/°C.) | SPECIFIC RESISTIVITY ($\mu\Omega$ cm) | COEFFICIENT OF TEMPERATURE RESISTANCE (R(1000° c.)/R(25° c.) | MELTING POINT (°C.) |
|---|---|---|---|---|
| WC | 4.9 | 19.2 | 1.495 | 2800 |
| TaN | 3.6 | 128 | 1.03 | 3360 |
| TaC | 6.29 | 42.1 | 2.07 | 3877 |
| TiN | 9.35 | 25.0 | 3.48 | 2900 |
| $MoSi_2$ | 8.3 | 21.6 | 7.48 | 2030 |
| $Mo_5Si_3$ | 4.3 | 45.9 | 1.66 | 2100 |
| $WSi_2$ | 8.21 | 12.5 | 3.91 | 2150 |
| $ZrB_2$ | 4.5 | 16.6 | — | 3040 |
| $LaCrO_3$ | 9.7 | $10^6$ | — | 2490 |
| NbN | 10.8 | 78.0 | 10.1 | 2050 |
| $Mo_2C$ | 6.15 | 71.0 | — | 2500 |
| $Si_3N_4$ | 3.2 | — | — | — |

(Source: Kou-Yuuten Kagoubutsu Bussei Binran (High-Melting point Compound Physical Property Handbook, published by Nisso Tsuushin Sha))

Particularly, since the difference in the coefficient of thermal expansion between WC or $Mo_5Si_3$ and the ceramic body is comparatively small, the resistive heating element made of WC or $Mo_5Si_3$ has a good durability. Further, it has extremely high melting point which is higher than 2000° C. Although the coefficient of resistant temperature of $MoSi_2$ is slightly large, the ordinary temperature resistant value is made small by adjusting the amount of the material. Accordingly, since the supply current in a range near the ordinary temperature is made large, the temperature increment characteristic can be improved. Accordingly, WC, $Mo_5Si_3$ and $MoSi_2$ are preferably used as the material of the resistive heating element.

It is preferable that the matrix ceramic phase is mainly composed of $Si_3N_4$ or AlN in account of the degree of sintering, the resistant adjustment, the heat/shock resistivity and the like.

On the other hand, preferably, the ceramic body is mainly composed of $Si_3N_4$ or AlN in accordance with the above reasons.

The reason of improvement in durability of the resistive heating element in the aforementioned ceramic heater is considered as follows. That is, in the ceramic electrically conductive material, the thermal expansion coefficient of the electrically conductive ceramic phase is generally different from that of the matrix ceramic phase. As a result, there arises a difference in average thermal expansion coefficient between the uneven distribution portion in which the electrically conductive phase particles are unevenly distributed and an ambient portion which is lower in the volume proportion of the electrically conductive ceramic phase particles than the uneven distribution portion (hereinafter referred to "ambient portion"), so that stress based on the thermal expansion coefficient difference is generated in the boundary between the uneven distribution portion and the ambient portion. This stress tends to increase as the size of the uneven distribution portion increases. When this stress increases to a predetermined value or more, destruction of the resistive heating element based on the stress occurs easily. However, it is considered that the value of the stress can be made relatively small enough to prevent the destruction by setting the size of the uneven distribution portion to be not larger than 5 $\mu$m.

Here, the size of the uneven distribution portion of WC type particles is defined on the basis of the particle size of WC type particles and the number of aggregated WC type particles. Although the size of the uneven distribution portion is desirably set to be as small as possible in a range of not larger than 5 $\mu$m from the point of view of improvement in the durability of the resistive heating element, there arises a problem that the cost of preparation of WC raw material powder increases because the mean particle size of WC type particles has to be set to be considerably small if the size of the uneven distribution is set to be too small. Accordingly, the lower limit of the size of the uneven distribution portion is preferably selected in such a range that the problem is avoided.

On the other hand, if the WC content of the electrically conductive ceramic material is larger than 80% by weight, no good resistive heating element obtained because the sintering property of the ceramic material is lowered. On the contrary, if the WC content is smaller than 30% by weight, the current-conduction heating characteristic of the resistive heating element becomes insufficient because the specific resistance of the material is too large. Accordingly, the WC content is preferably adjusted in a range of from 30 to 80% by weight, more preferably in a range of from 50 to 70% by weight.

Incidentally, the resistive heating element can be formed as an element obtained by mixing a predetermined amount of a sintering assistant agent into the aforementioned raw material powder and sintering the mixed material. In this case, as the sintering assistant agent, rare-earth or alkali-earth metal oxide such as $Y_2O_3$, $Er_2O_3$, $Yb_2O_3$, or the like, may be used. The proportion of the sintering assistant agent to be added is preferably adjusted in a range of from 0.8 to 10.5% by weight. If the proportion of the sintering assistant agent to be added is smaller than 0.8% by weight, sintering is insufficient so that no good resistive heating element can be obtained. On the contrary, if the proportion of the sintering assistant agent to be added is larger than 10.5% by weight, the heat resisting property of the resistive heating element is spoiled.

The present invention will be specifically described as the following embodiments referring to the accompanying drawings as follows.

Figure 1:
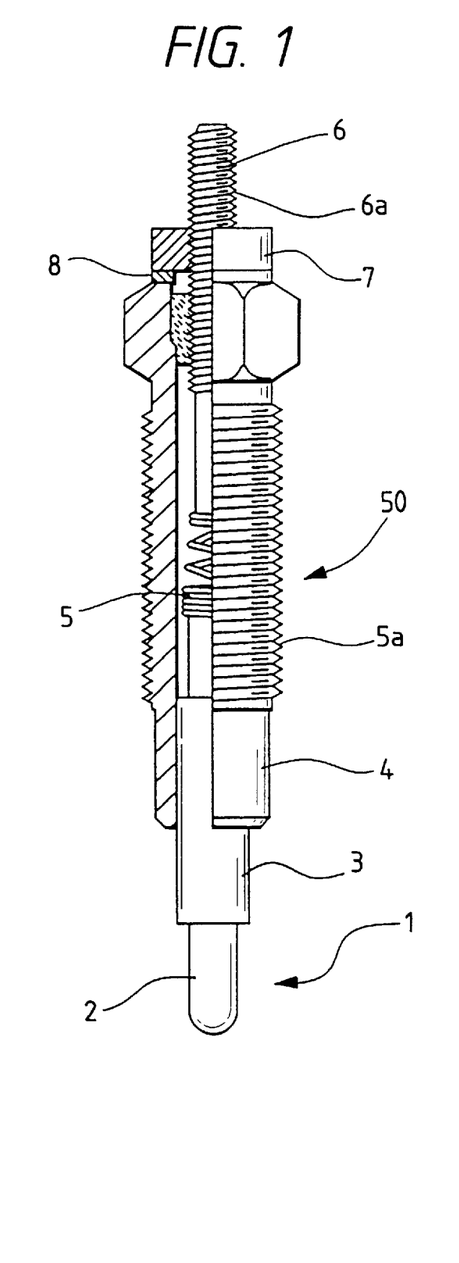
FIG. 1 is a frontal partial sectional view showing an example of a glow plug using a ceramic heater according to the present invention.

FIG. 1 shows a glow plug using a ceramic heater according to the present invention and the internal structure thereof. In FIG. 1, a glow plug 50 has a ceramic heater 1 provided in its one end side, an outer cylinder 3 of a metal for covering the outer circumferential surface of the ceramic heater 1 so as to project a front end portion 2 of the ceramic heater 1, a cylindrical metal housing 4 for further covering the outer cylinder 3 from the outside and the like. The ceramic heater 1 and the outer cylinder 3 are connected by brazing and the outer cylinder 3, and the metal housing 4 are also connected by brazing.

One end of a connection member 5 having opposite ends to each of which is formed from metal wire so as to be shaped like a coiled spring is fitted to a rear end portion of the ceramic heater 1 from the outside, and the other end of the connection member 5 is fitted to a corresponding one end portion of a metal shaft 6 inserted in the metal housing 4. The other end portion of the metal shaft 6 is extended to the outside of the metal housing 4, and a nut 7 is thread-engaged with a screw portion 6a formed on the outer circumferential surface of the metal shaft 6, so that the metal shaft 6 is fixed relative to the metal housing 4 by tightening the nut 7 toward the metal housing 4. Further, an electrically insulating bush 8 is fitted between the nut 7 and the metal housing 4. Further, a screw portion 5a for fixing the glow plug 50 to an engine block (not shown) is formed in the outer circumferential surface of the metal housing 4.

Figure 2:
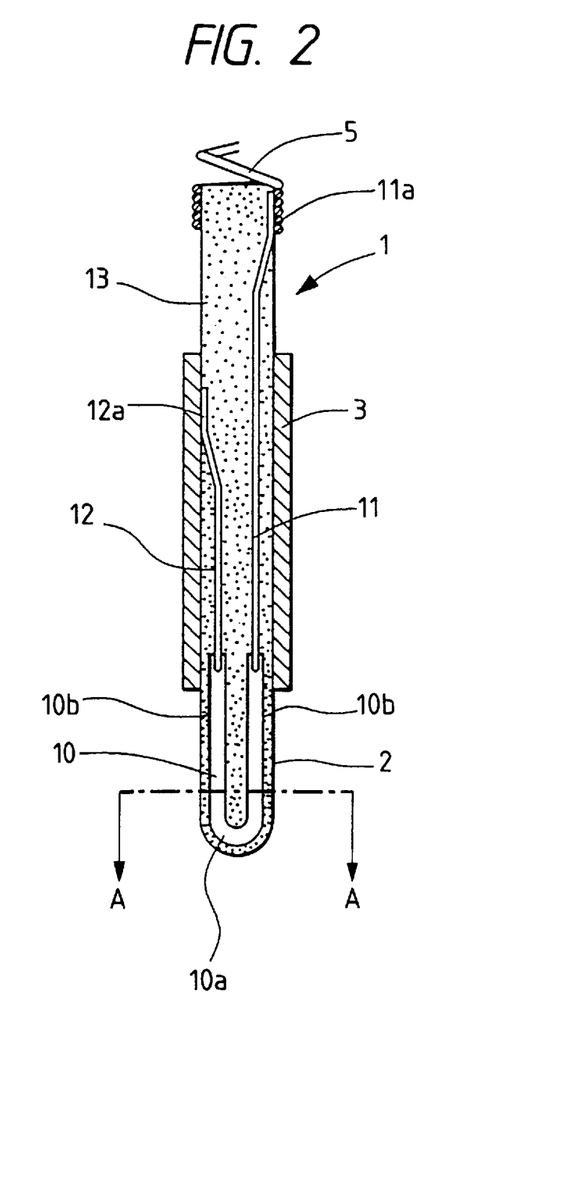
FIG. 2 is a frontal sectional view of the ceramic heater.

As shown in FIG. 2, the ceramic heater 1 has a U-shaped resistive heating element 10 composed of a change-direction portion 10a which extends from its one base end portion and changes its direction at its front end portion into a different direction toward its other base end portion, and two linear portions 10b which extend in the same direction from the respective base end portions of the change-direction portion 10a. One end of a linear or rod-like electrode portion 11 and one end of a linear or rod-like electrode portion 12 are embedded in the end portions of the two linear portions, respectively. The whole of the resistive heating element 10 and the electrode portions 11 and 12 is embedded in a rod-like ceramic body 13 having a circular section. The resistive heating element 10 is arranged so that the change-direction portion 10a is positioned in the end side of the ceramic body 13.

The ceramic body 13 is obtained by adding/mixing in a range of from 4 to 15%, preferably 6 to 12%, by weight of a sintering assist agent component of rare-earth or alkali-earth metal oxide such as $Y_2O_3$, $Er_2O_3$, $Yb_2O_3$ or the like to ceramic powder containing $Si_3N_4$ as a main component, and sintering the thus obtained mixture power.

Further, the resistive heating element 10 is obtained by adding/mixing in a range of from 0.8 to 10.5% by weight of the same sintering assist agent component as used in the ceramic body 13 to powder containing WC as a main component and powder containing $Si_3N_4$ as a main component, and by sintering the mixture powder. The WC content of the resistive heating element 10 is adjusted to be in a range of from 30 to 80% by weight, preferably in a range of from 50 to 70% by weight. Further, the sinter composition is obtained in a manner so that WC type particles are dispersed in an $Si_3N_4$ type matrix (matrix ceramic phase). Incidentally, when the powder mainly containing $MoSi_2$ is used, a part of $MoSi_2$ may be changed to $Mo_5Si_3$ by influence of the sintering assist agent. In this case, it is considerable that a part of Si component of $Mo_5Si_3$ couples with oxygen contained in the sintering assist agent to be deposit as $SiO_2$. Accordingly, in the case of adding $MoSi_2$, $MoSi_2$ and $Mo_5Si_3$ are apt to exist together. Incidetally, even in the case of using $Mo_5Si_3$, it is preferable that the content of these materials is the same as the case of using $MOSi_2$. Here, in the case where the percentage of the area of the WC type particles in a virtual circle drawn with a certain radius in the sinter composition is not smaller than 60%, the region enclosed by the circle is defined as an uneven distribution portion of WC type particles and the maximum diameter of the uneven distribution portion is adjusted so as to be not larger than 5 μm. On the other hand, each of the electrode portions 11 and 12 is formed from a high-melting-point metal material such as tungsten, tungsten-rhenium alloy, or the like.

Next, in FIG. 2, a thin layer (not shown) of a metal such as nickel or the like is formed on a surface of the ceramic body 13 and in a region including an exposure portion 12a of the electrode 12 by a predetermined method, for example, plating, gas-phase film-forming or the like. Through the metal thin layer, the ceramic body 13 and the outer cylinder 3 are jointed to each other by brazing, and the electrode portion 12 is electrically connected to the outer cylinder 3 through the joint portions. Further, a metal thin film is formed in a region including an exposure portion 11a of the electrode portion 11, and the connection member 5 is brazed to the thin film. In the aforementioned configuration, a current is made flow in the resistive heating element 10 from an electric source (not shown) through the metal shaft 6 (FIG. 1), the connection member 5 and the electrode portion 11 and grounded through the electrode portion 12, the outer cylinder 3, the metal housing 4 (FIG. 1) and the engine block (not shown).

Figure 3A:
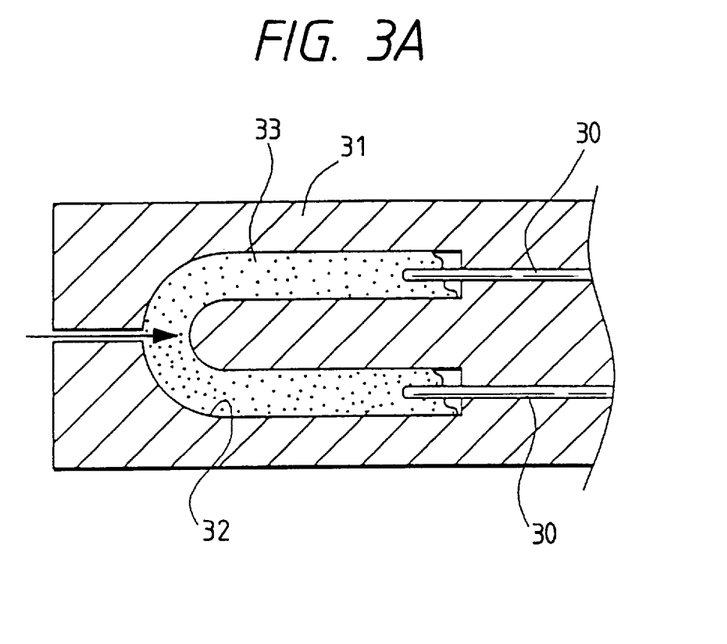
FIGS. 3A and 3B are views for explaining a process of producing the ceramic heater.
Figure 3B:
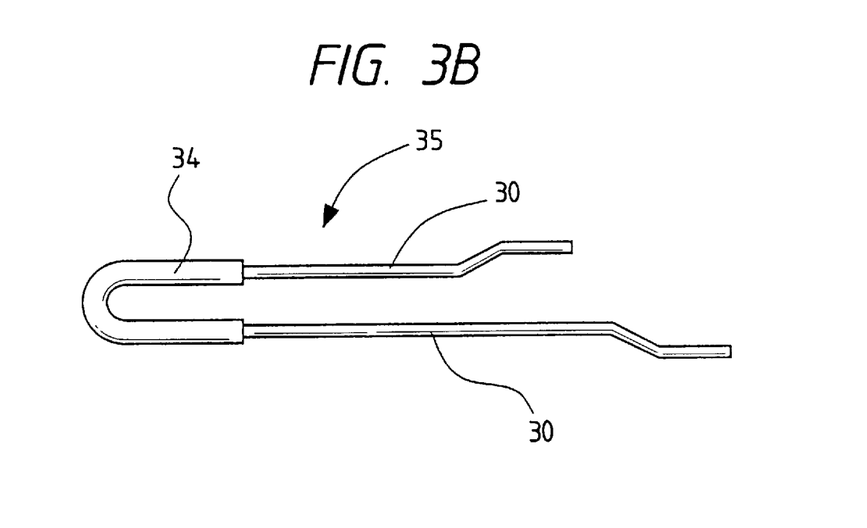

A method of producing the ceramic heater 1 will be described below. First, as shown in FIG. 3A, electrode materials 30 are arranged in a mold 31 having a U-shaped cavity 32 corresponding to the resistive heating element 10 so that one end portions of the respective electrode materials 30 are inserted into the end portions of the cavity 32. In this state, a compound 33 containing electrically conductive ceramic powder, powder containing $Si_3N_4$ as a main component, sintering assistant agent powder and a binder is injected to thereby form an integral molding 35 in which the electrode materials 30 are integrated with an electrically conductive ceramic power molding portion 34 as shown in FIG. 3B. Incidentally, the electrically conductive ceramic powder molding portion 34 is formed so as to have a substantially circular section.

The aforementioned compound 33 is prepared, for example, in such a manner as follows. First, a WC raw material, an $Si_3N_4$ raw material and a sintering assistant agent are mixed. The mixture is put together with a solvent and milling media such as ceramic balls or the like into a milling apparatus (for example, a rotary ball mill, a high-energy mill such as an attrition mill, a vibration mill or the like) so that the mixed raw materials are mixed and milled to obtain target particle sizes. Here, the milling condition, for example, such as the rotational speed, the milling time, the quantities of the solvent and milling media, etc. in the case of a rotary ball mill is adjusted so that the size of the uneven distribution portion of WC type particles in the sinter is not larger than 5 μm. For example, in the case where $Si_3N_4$ raw material powder has a particle size in a range of from 0.3 to 2.0 μm and a mean particle size of 0.8 μm and WC raw material powder has a particle size in a range of from 0.5 to 14 μm and a mean particle size of 1.8 μm in the mixed raw materials before milling, the milling condition is preferably set so that the mixture has a particle size in a range of from 0.1 to 1.5 μm and a mean particle size of 0.7 μm after milling regardless of the content proportion of the WC raw material powder. Incidentally, the particle size distribution and the mean particle size can be measured by using a laser analyzing method.

When milling is finished, the milling media are separated from raw material slurry and the solvent in the slurry is evaporated to thereby obtain electrically conductive ceramic powder. A binder constituted by wax or resin is kneaded to the electrically conductive ceramic powder and the kneaded mixture is further pelletized into a predetermined size so as to obtain a compound for injection molding.

Figure 4A:
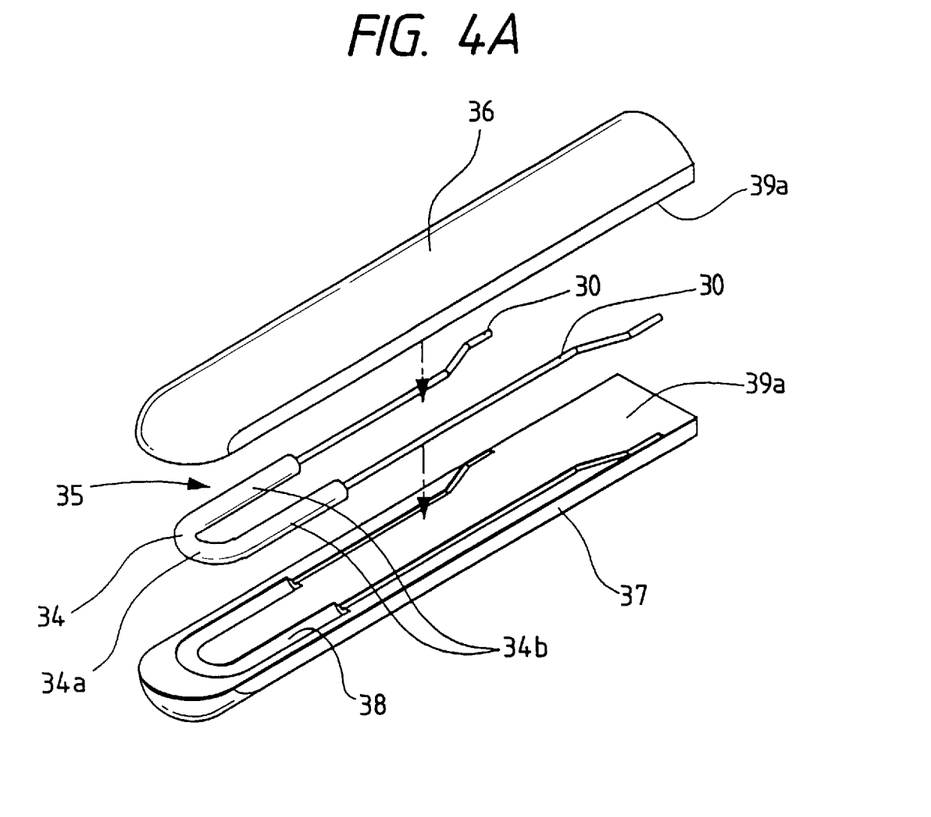
FIGS. 4A and 4B are views for explaining the process continued from FIGS. 3A and 3B.
Figure 5A:
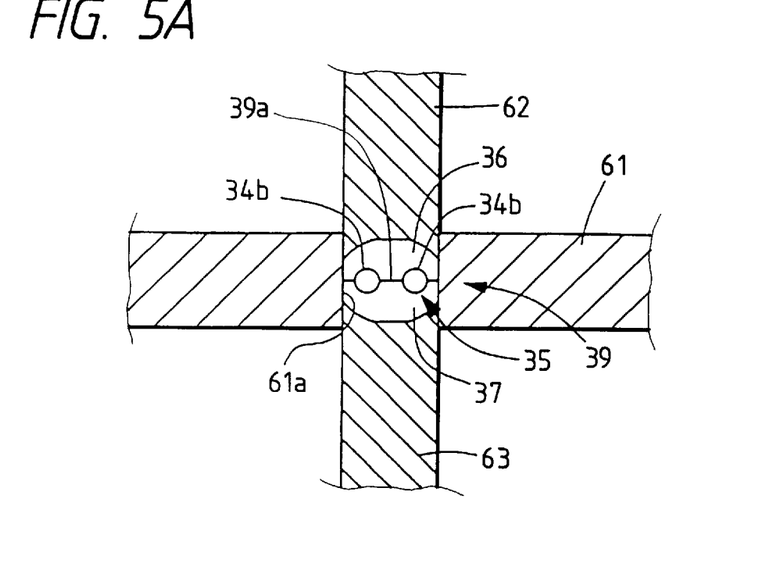
FIGS. 5A and 5B are views for explaining the process continued from FIGS. 4A and 4B.
Figure 5B:
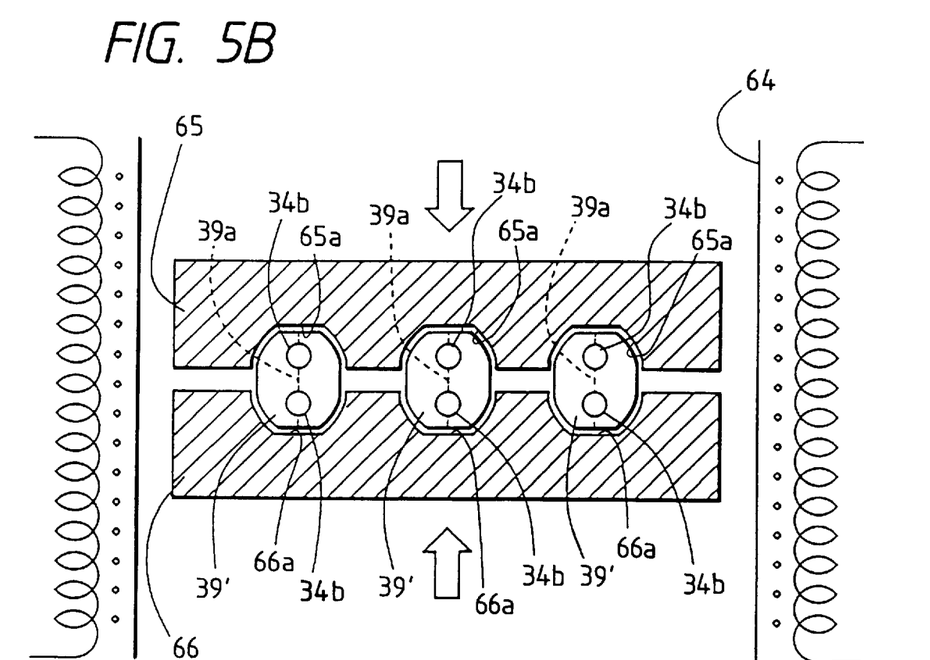
Figure 6A:
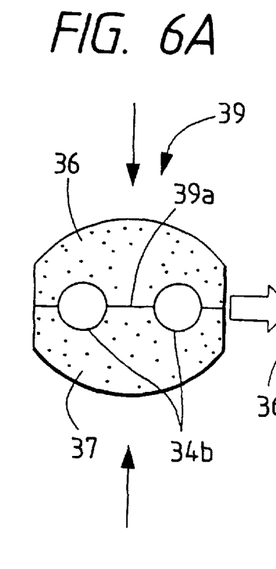
FIGS. 6A to 6D are typical views showing the change in sectional shape of a composite molding and a sintered body in a method of producing the ceramic heater according to the present invention.

On the other hand, a predetermined amount of a binder is added to the ceramic powder so as to form the ceramic body 13, and then the mixture is press-molded to thereby obtain split preforms 36, 37 provided separately as upper and lower portions as shown in FIG. 4A. Each of these split preforms 36, 37 has a concave portion 38 formed in a mold-register face 39a having a shape correspondingly to the aforementioned integral molding 35. Then, the integral molding 35 is received in the concave portion 38, and the split preforms 36, 37 are mold-registered in the mold-register faces 39a. Then, as shown in FIG. 5A, the split preforms 36, 37 and the integral molding 35 in this condition are received in a cavity 61a of a mold 61 and pressed/compressed by using punches 62, 63 to thereby form a composite molding 39 in which the integral molding 35 and the split preforms are integrated with each other as shown in FIGS. 5B and 6A. Here, the pressing direction is selected to be substantially perpendicular to the mold-register faces 39a of the split preforms 36, 37.

Figure 4B:
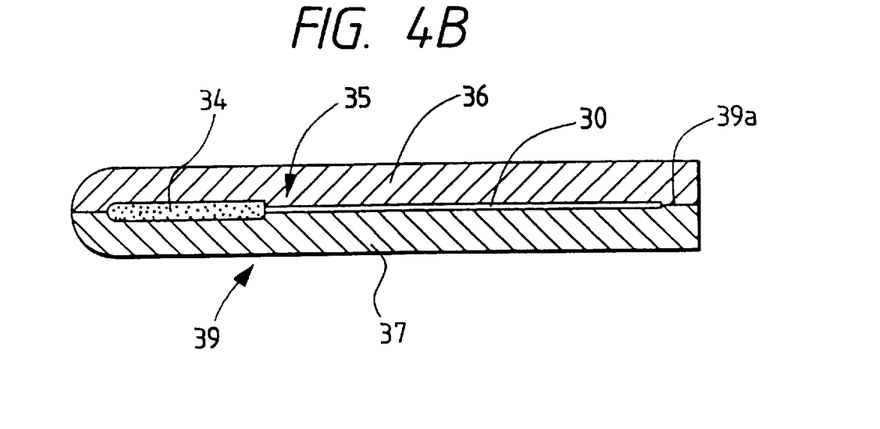
Figure 6B:
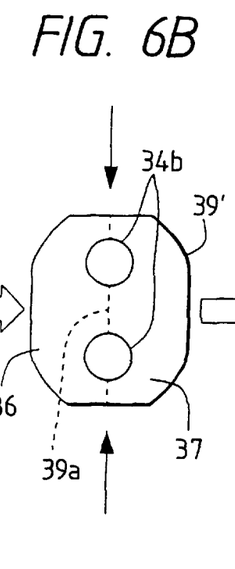
Figure 6C:
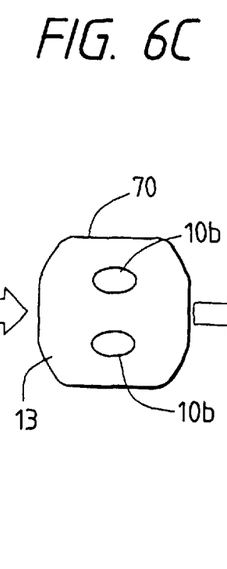

In order to remove the binder component or the like, the thus obtained composite molding 39 is first calcined at a predetermined temperature (for example, about 800° C.) to thereby form a calcined matter 39' as shown in FIG. 6B. Then, as shown in FIG. 5B, the calcined matter 39' is set in cavities 65a, 66a of hot-press molds 65, 66 formed from graphite or the like. While pressed between the two molds 65, 66 in a furnace 64, the calcined matter 39' is sintered at a predetermined temperature (for example, about 1800° C.) so as to form a sintered body 70 as shown in FIG. 6C. At this time, the electrically conductive ceramic powder molding portion 34 and the split preforms 36, 37 as shown in FIG. 4B are designed to form the resistive heating element 10 and the ceramic body 13, respectively. Further, the electrode materials 30 form the electrode portions 11 and 12, respectively.

Figure 6D:
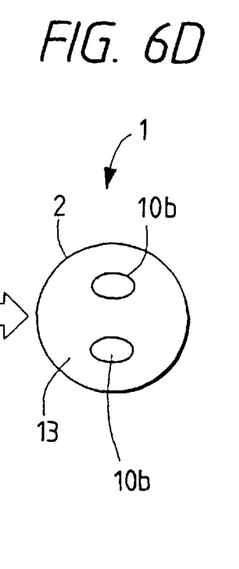

Here, while the calcined matter 39' is compressed along the mold-register faces 39a of the split preforms 36, 37, a sintered body 70 is formed as shown in FIG. 6B. Then, as shown in FIG. 6C, the circular section in each of the linear portions 34b of the electrically conductive ceramic powder molding portion 34 is deformed so as to be squeezed in the aforementioned compressing direction to thereby form linear portions 10b of the ceramic heating element 10 having an ellipsoid section. Then, as shown in FIG. 6D, the outer circumferential surface of the sintered body 70 is processed by polishing, or the like, so as to shape the section of the ceramic body 13 circularly to thereby form a final ceramic heater 1.

Figure 7:
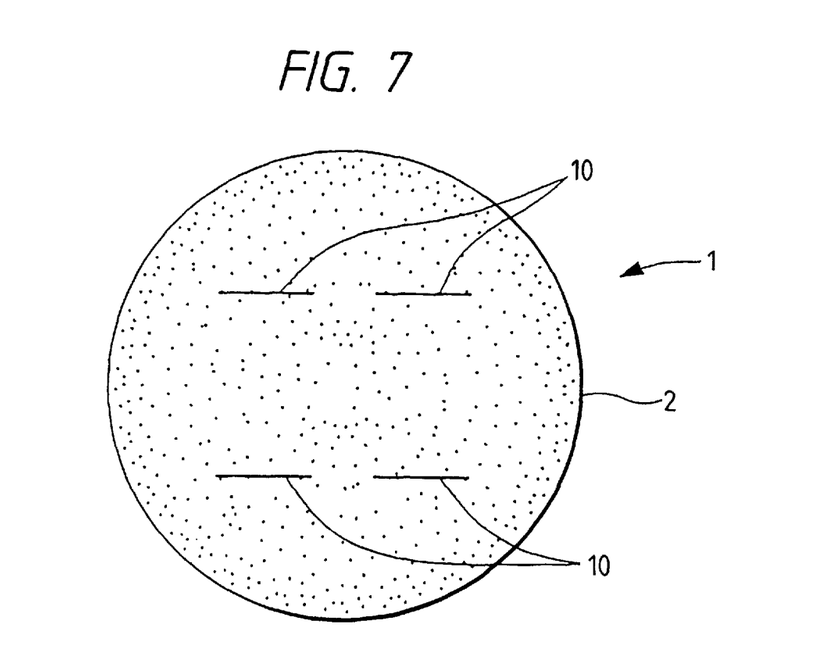
FIG. 7 is a sectional view showing a modified example of the ceramic heater according to the present invention.

Incidentally, as shown in FIG. 7, a heating element may be pattern-printed on a molding of ceramic powder body by using paste of electrically conductive ceramic powder and may be sintered the printed heating element pattern to thereby form a resistive heating element 10.

Further, the ceramic heater according to the present invention can be applied not only to the glow plug but also to a heating element for burner ignitor or oxygen sensor or the like.

EXAMPLES

Various ceramic heaters 1 each having the shape shown in FIG. 2 were produced by the aforementioned method. Incidentally, the content of the WC component contained in the resistive heating element 10 was adjusted to be in a range of from 30 to 80% by weight (Examples 1 to 4). Further, hot-press sintering was carried out at 1750° C. and 300 kgf/cm² for 30 minutes. Two ceramic heaters per composition were produced. of the two, one ceramic heater was cut and the section of its resistive heating element portion was polished. Then, the aggregating condition of WC type particles in the polished surface was observed by using a scan electronic microscope (hereinafter referred to as "SEM"), and a region in which 60% or more of WC type particles in the area proportion (that is, volume proportion) existed was regarded as an uneven distribution portion described in the present invention. In any one of the ceramic heaters of Examples 1 to 4, the maximum size of its uneven distribution portion was not larger than 5 μm. On the other hand, a sample in which the WC component was not larger than 30% by weight and a sample in which the WC component was larger than 80% by weight (Comparative Examples 1 and 2) were produced for comparison. Incidentally, the ceramic heaters of Comparative Examples were set so that the maximum size of the uneven distribution portion of WC type particles was larger than 5 μm, specifically in a range of from 8 to 10 μm.

The ceramic heaters were examined their current-conduction durability by the following method. That is, one cycle is defined as the step in which a predetermined voltage was applied to each of the ceramic heaters to make a current flow in the ceramic heaters, the current-conduction state was kept for 5 minutes after the temperature was equilibrated to 1400° C., the current conduction was then stopped, and the state was kept for 1 minute. This step was repeated by 10,000 cycles for every ceramic heater. The case where lowering of the heating temperature not smaller than 150° C. compared with the case of current conduction in the first cycle was observed in this stage was judged to be bad and the other case where such lowering was not observed was judged to be good. The results are shown in Table 2.

TABLE 2

| | Composition of resistive heating element (wt %) | | | Size of WC particle | Durability under |
|---|---|---|---|---|---|
| | WC | Si₃N₄ | Y₂O₃ | aggregate | current conduction |
| Example 1 | 80 | 18 | 2 | 3 μm or less | OK |
| Example 2 | 75 | 22.5 | 2.5 | 3 μm or less | OK |
| Example 3 | 60 | 39.6 | 0.4 | 3 μm or less | OK |
| Example 4 | 30 | 63 | 7.0 | 3 μm or less | OK |
| Comp Ex 1 | 85 | 13.5 | 1.5 | 6 μm | NG |
| Comp Ex 2 | 25 | 67.5 | 7.5 | 5 μm | insufficient heat generation due to large resistance |

That is, any one of the ceramic heaters of Examples exhibited good current-conduction durability whereas the ceramic heater of Comparative Example 1 exhibited insufficient current-conduction durability. It is considered that because the WC content in the ceramic heater of Comparative Example 1 was too large to perform sintering sufficiently and, accordingly, not only the strength of the resistive heating element was insufficient but also the size of the uneven distribution portion of WC particles was large so that relatively large stress was generated on the basis of the thermal expansion coefficient difference between the uneven distribution portion and the ambient portion to bring about damaging/breaking of the resistive heating element. On the contrary, in the ceramic heater of Comparative Example 2 in which the WC content was small, the electric resistance was too high to obtain sufficient heating.

Figure 8A:
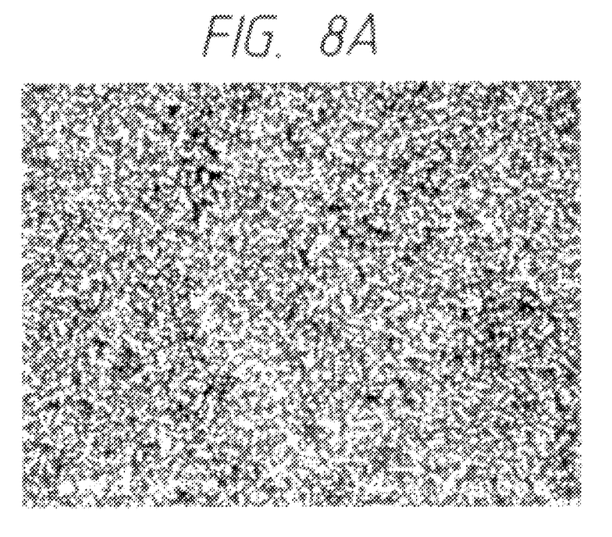
FIGS. 8A and 8B are SEM photographs showing a sectional composition of the resistive heating element in the ceramic heater of Example 3.
Figure 8B:
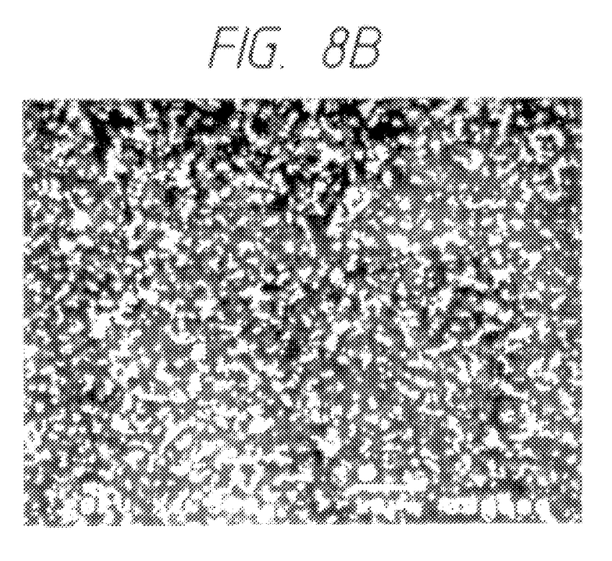
Figure 9A:
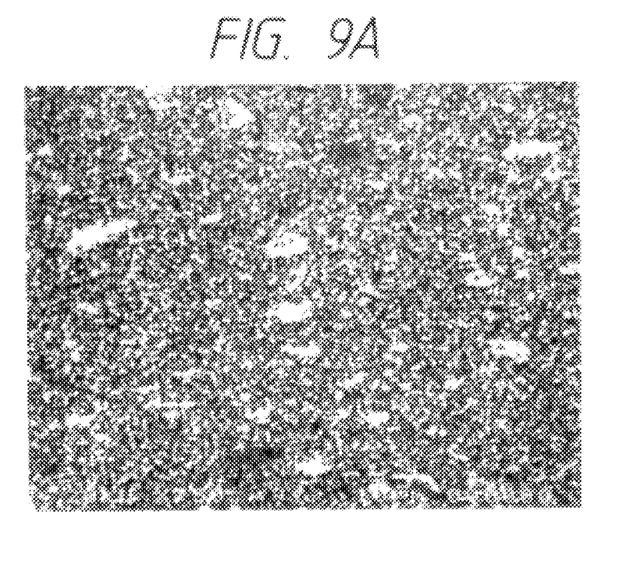
FIG. 9A and 9B are SEM photographs showing a sectional composition of the resistive heating element in the ceramic heater of a comparative example.
Figure 9B:
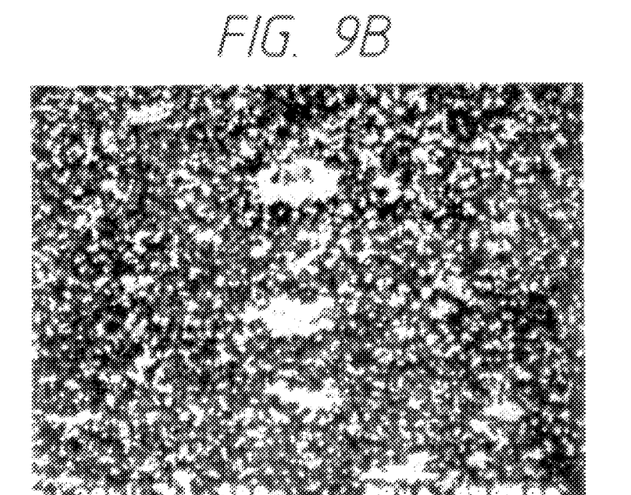

FIGS. 8A and 8B show SEM composition photographs of the resistive heating element portion of the ceramic heater of Example 3. In the composition, the whitish portions are regarded as portions corresponding to WC type particles and the blackish portion is regarded as a portion corresponding to the $Si_3N_4$ matrix. The WC type particles are dispersed relatively evenly so that there is no observation of the uneven distribution portion having a size larger than 5 $\mu$m. On the other hand, FIGS. 9A and 9B show SEM composition photographs of the resistive heating element portion of the ceramic heater of Comparative Example 1. It is apparent from FIG. 9 that the uneven distribution portion in which WC type particles are considerably large in size (about 10 $\mu$m) is formed.

What is claimed is:

1. A ceramic heater comprising:

a ceramic body; and a resistive heating element comprising a ceramic electrically conductive material which is embedded in said ceramic body, said ceramic electrically conductive material containing a matrix ceramic phase and electrically conductive ceramic phase particles dispersed in said matrix phase in the range of 30 to 80% by weight; wherein, if an area includes at least 60% of the electrically conductive ceramic phase particles, then that area is referred to as an uneven distribution portion and the maximum allowable size of this uneven distribution portion such that thermally induced stress within the heating element is lower than a heating element absent this limitation is an area enclosed by a circle having a diameter of at most 5 $\mu$m.

2. A ceramic heater according to claim 1, wherein said electrically conductive ceramic phase comprises at least one selected from the group consisting of silicide of W, Ta, Nb, Ti, Mo, Zr, Hf, V and Cr; carbide of W, Ta, Nb, Ti, Mo, Zr, Hf, V and Cr; boride of W, Ta, Nb, Ti, Mo, Zr, Hf, V and Cr; and nitride of W, Ta, Nb, Ti, Mo, Zr, Hf, V and Cr.

3. A ceramic heater according to claim 2, wherein said electrically conductive ceramic phase comprises at least one selected from the group consisting of WC, $Mo_5Si_3$ and $MoSi_2$.

4. A ceramic heater according to claim 1, wherein said ceramic body comprises one selected from the group consisting of $Si_3N_4$ and AlN.

5. A ceramic heater according to claim 1, wherein said matrix ceramic phase comprises one selected from the group consisting of $Si_3N_4$ and AlN.

6. A ceramic heater according to claim 1, wherein said ceramic electrically conductive material contains said electrically conductive ceramic phase in the range of 50 to 70% by weight.

7. A ceramic heater according to claim 1, wherein said resistive heating element contains a sintering assistant agent in the range of 0.8 to 10.5% by weight.

8. A ceramic heater according to claim 1, wherein said ceramic body contains a sintering assistant agent in the range of 4 to 15% by weight.

\* \* \* \* \*